US009302331B1

(12) United States Patent    (10) Patent No.:    US 9,302,331 B1
King                         (45) Date of Patent:   Apr. 5, 2016

(54) SHOP TOOL ATTACHMENT

(71) Applicant: Michael King, Wellsville, MO (US)

(72) Inventor: Michael King, Wellsville, MO (US)

(*) Notice: Subject to any disclaimer, the term of this patent is extended or adjusted under 35 U.S.C. 154(b) by 254 days.

(21) Appl. No.: 13/815,161

(22) Filed: Feb. 5, 2013

Related U.S. Application Data

(60) Provisional application No. 61/633,345, filed on Feb. 9, 2012.

(51) Int. Cl.
   B23B 39/16    (2006.01)
   B23B 47/30    (2006.01)
   B23B 41/00    (2006.01)
   B23B 47/26    (2006.01)

(52) U.S. Cl.
   CPC ............ *B23B 47/30* (2013.01); *B23B 41/00* (2013.01); *B23B 47/26* (2013.01); *B23B 39/161* (2013.01); *B23B 39/162* (2013.01); *Y10T 408/38* (2015.01); *Y10T 408/385* (2015.01)

(58) Field of Classification Search
   CPC ..................... B23B 39/161; B23B 39/162
   USPC ............. 408/1 R, 42, 53, 117, 203, 25
   See application file for complete search history.

(56) References Cited

U.S. PATENT DOCUMENTS

| 658,782 | A | * | 10/1900 | Kellogg | 408/53 |
|---|---|---|---|---|---|
| 1,246,250 | A | * | 11/1917 | Eisler | 74/665 R |
| 2,068,594 | A | * | 1/1937 | Buhr | 384/518 |
| 2,293,991 | A | * | 8/1942 | Linderme | 408/117 |
| 2,706,918 | A | * | 4/1955 | Blatt | 408/51 |
| 3,753,625 | A | * | 8/1973 | Fabrizio et al. | 408/239 R |
| 4,145,160 | A | | 3/1979 | Wiggins | 408/103 |
| 4,594,032 | A | | 6/1986 | Warburg | 408/115 R |
| 4,728,230 | A | * | 3/1988 | Blum | 408/53 |
| 5,024,564 | A | | 6/1991 | Lloyd | 408/115 R |
| 5,074,025 | A | * | 12/1991 | Willard, III | 29/505 |
| 5,085,543 | A | * | 2/1992 | Click | 408/48 |
| 5,154,548 | A | | 10/1992 | Walsh | 408/72 R |
| 7,001,118 | B1 | | 2/2006 | Weinstein | 408/103 |

OTHER PUBLICATIONS

Machine instruction manual title "Spindle Line Boring Machine", copyright 2005.

* cited by examiner

*Primary Examiner* — Eric A Gates
*Assistant Examiner* — Paul M Janeski
(74) *Attorney, Agent, or Firm* — Jacobson & Johnson LLC

(57) ABSTRACT

An inexpensive shop tool attachment for forming a set of precisely aligned holes in a work pierce where the shop tool attachment mounts to and receives power and mobility from the shop tool.

8 Claims, 3 Drawing Sheets

SHOP TOOL ATTACHMENT

CROSS REFERENCE TO RELATED APPLICATIONS

This application claims priority from provisional application Ser. No. 61/633,345 file Feb. 9, 2012.

STATEMENT REGARDING FEDERALLY SPONSORED RESEARCH OR DEVELOPMENT

None

REFERENCE TO A MICROFICHE APPENDIX

None

BACKGROUND OF THE INVENTION

This invention relates generally to an attachment for a shop tool that enable a shop person to form a set of precision holes, which are spaced apart from each other as well as in alignment with each other without having to invest in an expensive line bore machine. The concept of standalone line bore machines for forming a set of precision holes is known in the art. Typically, line bore machines are a specialty tool used to form a set of blind or through holes for receiving dowel pins, which may for example be used to support a shelf. One type of line boring machine, which is sold by Delta Machinery, comprises a standalone apparatus having an integral power source and a workhead containing a set of drills that are rotatingly supported in the line bore machine. In operation, of the Delta Machinery standalone line bore machine a workpiece is placed below a set of rotating drills that extend outward from an integral workhead. Next, one lowers the rotating drills into the workpiece to simultaneously drill a set of holes that are fixedly spaced from each other as well as in alignment with each other. While such line bore machines work well the infrequent use and the cost of the standalone line bore machine makes it financially unfeasible for a person with a home workshop or small business to purchase a standalone line bore machine. For example, a person, who has a home work shop, may want to build a single piece of furniture that requires a set of precisely aligned and spaced holes that are to receive dowel pins which will be used to support shelves. The cost of the line bore machine for occasional or limited home workshop use or limited small business use makes the purchase of a line bore machine impractical. On the other hand the home workshop owner needs a reliable and accurate device to form such holes or the article will have an inferior appearance.

An alternate less expensive method for a hobbyist or a person with a home workshop or small business is to use a drill guide that contains a set of precisely aligned and spaced holes that form a template for drilling a set of precision holes. Typically, one clamps the drill guide to the workpiece and then uses a hand drill or drill press to drill a set of aligned and spaced holes by successively inserting a rotating drill bit into each of the openings in the drill guide. Although such a guide is an inexpensive alternative to a standalone line bore machine it requires care in setting up and aligning the drill guide, particularly if the number of drilled holes exceeds the number of guide holes in the drill guide. In addition, it is easy for an axis of the holes drilled with a hand drill to be misaligned from a perpendicular condition since each of the holes are drilled separately without the assistance of an axis guide. Unfortunately, a misalignment in the axis of the holes may result in a subsequent misalignment of a dowel pin located therein, which not only detracts from the appearance of the article but may also provide an uneven shelf support if the holes are used for supporting dowel pins.

SUMMARY OF THE INVENTION

An inexpensive shop tool attachment or a tool jig that can be quickly mounted to a conventional shop tool to enable an operator to simultaneously and precisely form a set of spaced apart and aligned blind holes or through holes in a workpiece with the shop tool attachment including a hub for mounting to a conventional shop machine and a drive shaft for coupling to a shop tool power source. The shop tool attachment includes a polymer plastic workhead containing a set of polymer plastic gears rotationally supported by a set of plain bearings with each of the gears supporting a drill bit. The hollow hub contains the rotatable drive shaft that can be directly coupled to the power source of an existing shop tool to simultaneously power each of a plurality of drill bits to thereby enable an operator to simultaneously form a set of aligned holes through the mobility of the shop tool. The invention also includes a method of making an inexpensive shop tool attachment as well as a method of forming a set of precision aligned holes in a homework shop by mounting the shop tool attachment to an existing shop tool.

DESCRIPTION OF THE PREFERRED EMBODIMENT

Figure 1:
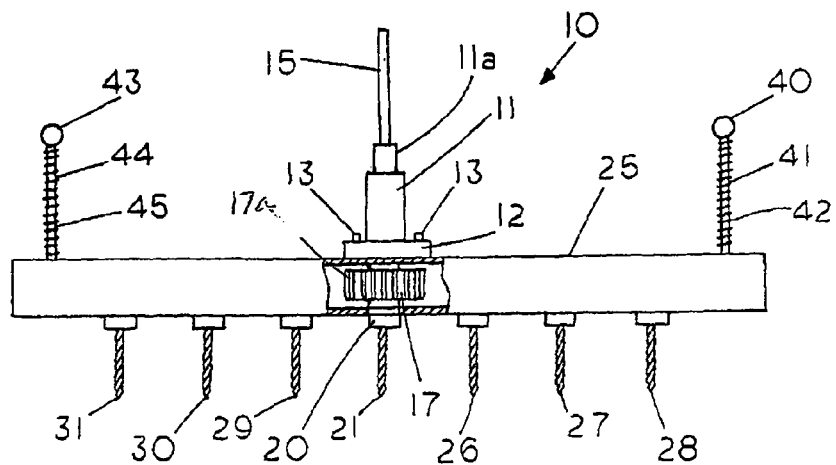
FIG. 1 is a front view partially in section of the shop tool attachment.
Figure 5:
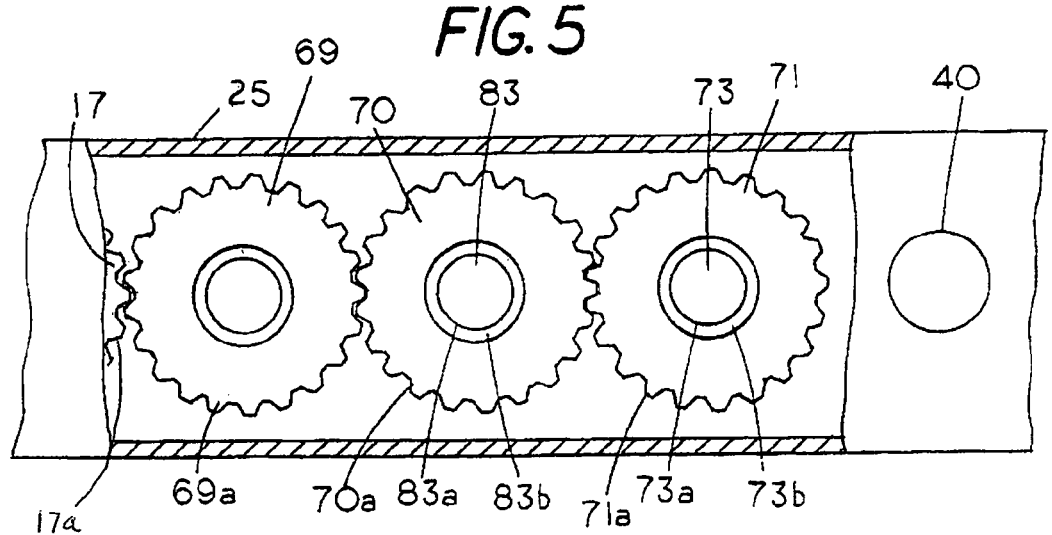
FIG. 5 is a cutaway top view of the shop tool attachment of FIG. 1.

FIG. 1 is a front view, partially in section, of a shop tool attachment 10 having an elongated housing or workhead 25 with an outwardly extending support hollow hub 11 having a flange 12, which may be integral to the hub or secured to the workhead 25 by fasteners 13, which may be threaded fasteners, an adhesive or the like. Hub 11 has a cylindrical neck 11a that typically fits into a typical shop tool split clamp mechanism with the larger diameter portion of hub 11 forming an axial stop to limit the depth that the hub 11 can be mounted in the clamp mechanism. Hub 11 and neck 11a cooperate to provide an elongated extension for removable mounting and fixedly supporting the workhead 25 in conventional shop tools such as a drill press or a mortising machine although no limitation to such tools is intended. Hub 11 may preferably be made of a rigid material such as metal in order to facilitate a compression mounting of the attachment 10, however, the hub may also be made from a thermoset plastic without departing from the spirit and scope of the invention. Extending axially outward from hollow hub 11 is a rotatable drive axle or drive shaft axle 15 that on one end connects to the power tool and on the other end connects to a workhead central drive gear 17, which contains a shear pin 15a (FIG. 8) to prevent accidental breakage of the workhead 25 or the drill bits if an obstruction is encountered during the drilling operation. In operation, the hub 11 holds the shop tool attachment 10 in a fixed position while the shop tool power source rotates axle 15, drive gear 17 and a gear drive mechanism within workhead 25. For example, if a drill press is used as a shop tool a drill chuck such as a Jacob chuck or the like can be frictionally secured to the exterior surface of drive shaft axle 15 to rotationally rotate shaft 15 which in turn rotates the central drive gear 17. Drive gear 17 is shown in isolated view in FIG. 1, however, in operation the teeth of drive gear 17 are in meshing engagement with the teeth of the gears on opposite sides of the drive gear to enable drive gear 17 to simultaneously drive the gears in engagement therewith. A reference to FIG. 5 shows how the teeth of drive gear 17 are in engagement with an adjacent gear in workhead 25.

Figure 8:
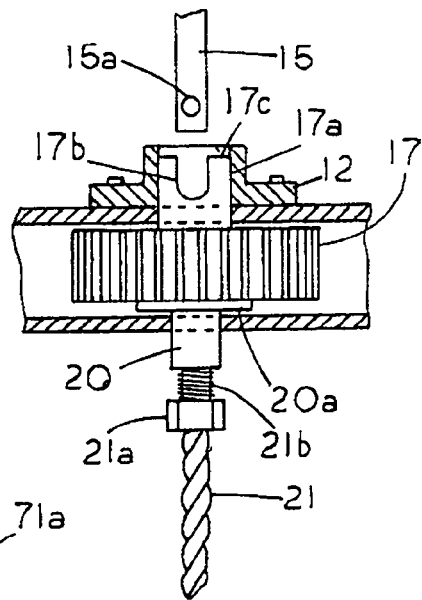
FIG. 8 is a partial sectional view of the shop tool attachment revealing the central drive gear and drive shaft.

FIG. 8 shows an isolated partial sectional and exploded view of central drive gear 17 revealing a power link from drive shaft 15 to a cylindrical upper axle 17c having a U shaped slot with ears 17b and 17a therein for forming mating engagement with driveshaft 15 and a shear pin 15a that extends cross wise through shaft 15 to mechanically engage the ears or sides 17b and 17a in axle 17c. In the example shown the drive shaft is typically made from metal such as steel, however other materials may be used without departing from the sprit and scope of the invention. The pin 15a may be made of a polymer plastic or other material that is sufficient strong to withstand the torque applied from the shop tool attached thereto yet will break or shear under undue resistance. In some cases the pin 15a may be a rigid material such as metal and other cases pin 15a may be a polymer plastic or the like which shears in response to an undue resistance encountered by the workhead 25. Typically, the axle 17c, the gears are formed from a polymer plastics that also yields in response to undue torque so that in the event that one of the gears in the workhead 25 should malfunction or if one of the drill bits should encounter undue resistance power is interrupted to the workhead 25 either through shearing of pin 15a or through bending or breaking ears 17c and 17b which limits workhead damage to replacement of the shear pin 15a or to replacement of the drive gear 17. Thus, in the example shown workhead 25 contains two safety links i.e. a two stage mechanical fuse comprising a shear pin 15a and yieldable ears 17a and 17b. However, in most cases it may be preferable to use only one of the safety links.

FIG. 8 also shows a lower plain bearing 20 and a plain bearing 20a of gear 17 with a drill bit 21 having a hex surface 21a and male thread 21b in rotational securement to a set of threads (not shown) located in the plain bearing 20.

In the example shown in FIG. 1 the elongated housing or workhead 25 rotationally supports a set of seven drill bits 20, 21, 26, 27, 28, 29, 30 and 31, which are located in alignment with each other. Although seven drill bits are shown more or less may be used without departing from the sprit and scope of the invention. An odd number of gears or drills is preferred since an equal number of gears or drills can be located on each side of the central drive gear. Located on each end of housing 25 are reference pins 45 and 42. Reference pin 45 includes a compression spring 44 and a knob 43 to allow one to extend the reference pin into a workpiece drill hole for ease in aligning and positioning the shop tool attachment 10 to form more than seven holes. Similarly, reference pin 42 includes a compression spring 41 and a knob 40 for extending the shaft 42 into a workpiece drill hole. FIG. 1 reveals that the workhead 25 includes a drive gear 17, which has a set of circumferential teeth 17a for intermeshing engagement with an adjacent gear. Although a set of spur gears is shown either a set of spur gears or a set of bevel gears may be used without departing from the spirit and scope of the invention. In the example shown three gears are located on each side of a central drive gear 17. In this example drive gear 17 is a spur gear, which rotationally drives a set of spur gears, which are located in meshing engagement with each other. For clarity the spur gears in engagement with spur gear 17 have been left out of FIG. 1, however, reference to FIG. 5 shows the intermeshing engagement of a gear 69 located on one side of drive gear 17.

Figure 2:
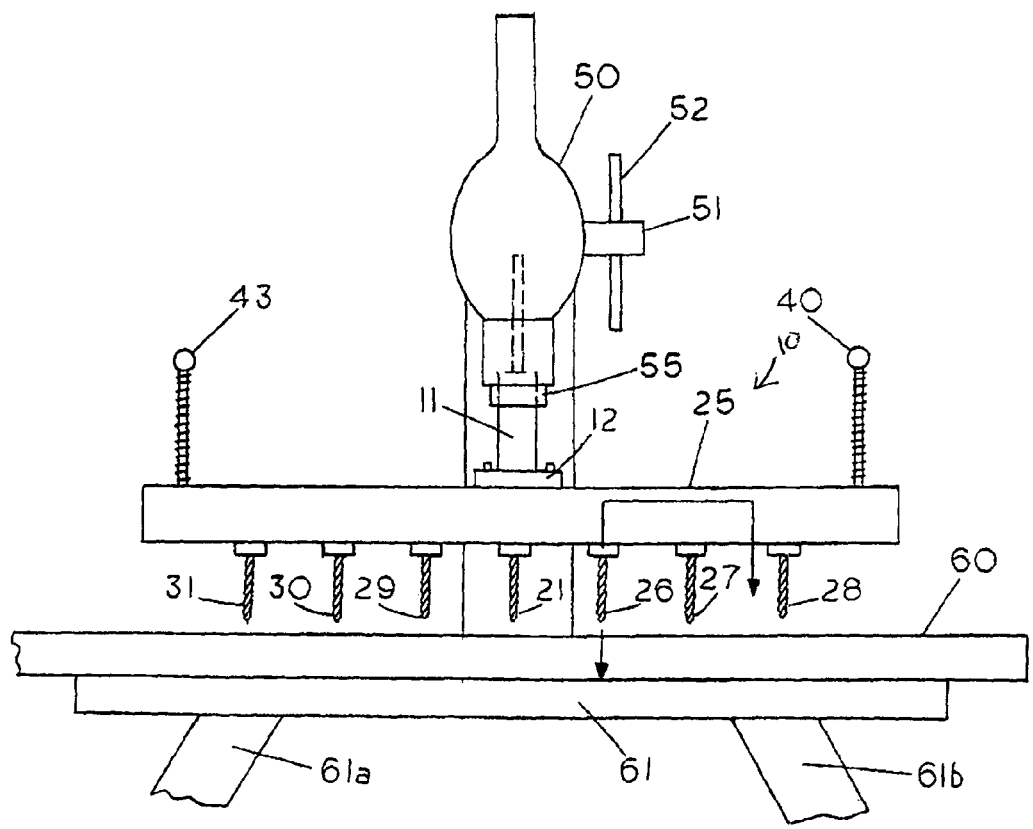
FIG. 2 is a front view of the shop tool attachment of FIG. 1 mounted on a mortising machine.

FIG. 2 shows the shop tool attachment 10 mounted to an existing conventional shop tool 50, such as a mortising machine, through the frictional or clamping attachment of the hub 11 to a friction mount 55 or the like on the machine workhead. Mortising machine 50 includes a rotatable gear shaft 51 that can be used to raise or lower the shop tool attachment 10 though rotation of handle 52. That is, the conventional mechanism 51 for raising and lowering the work head of the machine can also be used to raise and lower the shop tool attachment 10. An integral table 61 having a set of four legs, only two are shown, supports a work piece 60 beneath the seven drill bits 21, 26, 27, 28, 29, 30, and 31. Once mounted to the machine 50 the shop tool attachment 10 permits the hobbyist or small business owner to simultaneously drill a set of precisely aligned and spaced holes in a work piece by lowering the rotating drills extending from the elongated housing of workhead 25 into a workpiece 60. Thus both the power head mobility feature of the shop tool and the power of the shop tool can be used to operate the shop tool attachment 10.

Figure 3:
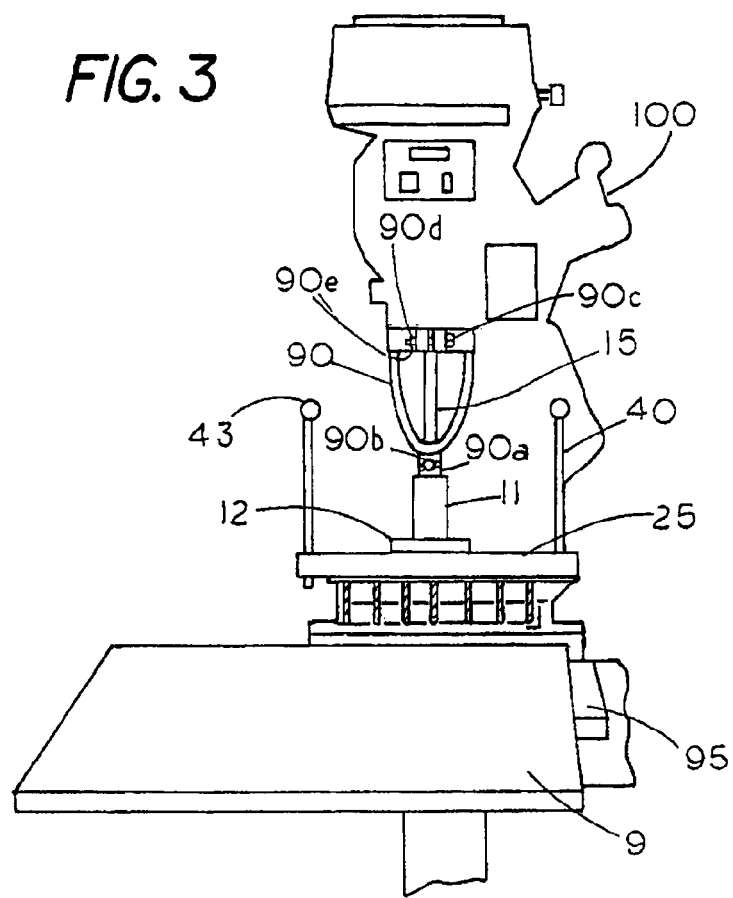
FIG. 3 is a front view of the shop tool attachment of FIG. 1 mounted on a drill press.

FIG. 3 shows the versatility of the shop tool attachment 10 through the mounting of the shop tool attachment 10 to a conventional drill press 100. In this example a V shaped bracket 90 mounts to hub 11 and to drill press 100 through a friction mount, to hold the shop tool attachment 10 in a fixed position with respect to a workhead of the drill press 100. Bracket 90 includes a split collar having a bolt 90d extending through the split collar. Bolt 90d has a hex head 90c on one end and a hex nut 90e on the opposite end to enable one to clamp the bracket to the shop machine through tightening of nut 90e on bolt 90d. Typically, the opposite end 90a of the compression collar can be placed around the exterior of hub 11 and then compressed by tightening a bolt 90b or the like to frictionally grasp and securely hold the hub 11 and the workhead 25 during a drilling operation. In this example the drive shaft 15, which is part of the shop tool attachment, is mounted with one end in frictional clamping engagement with a chuck (not shown) to provide for rotation of drive shaft 15 using the power source of drill press 100. A neck 11a (see FIG. 1) on hub 11 extends into an opening in clamp end 90a where the end of a transverse or diametrically extending wing bolt 90b can be hand tighentable against the hub neck 11a to thereby clamp and hold the cylindrical extension or neck 11a of hub 11 therein. In this application a worktable 95 supports the workpiece 9, which is located below the workhead 25.

Figure 4:
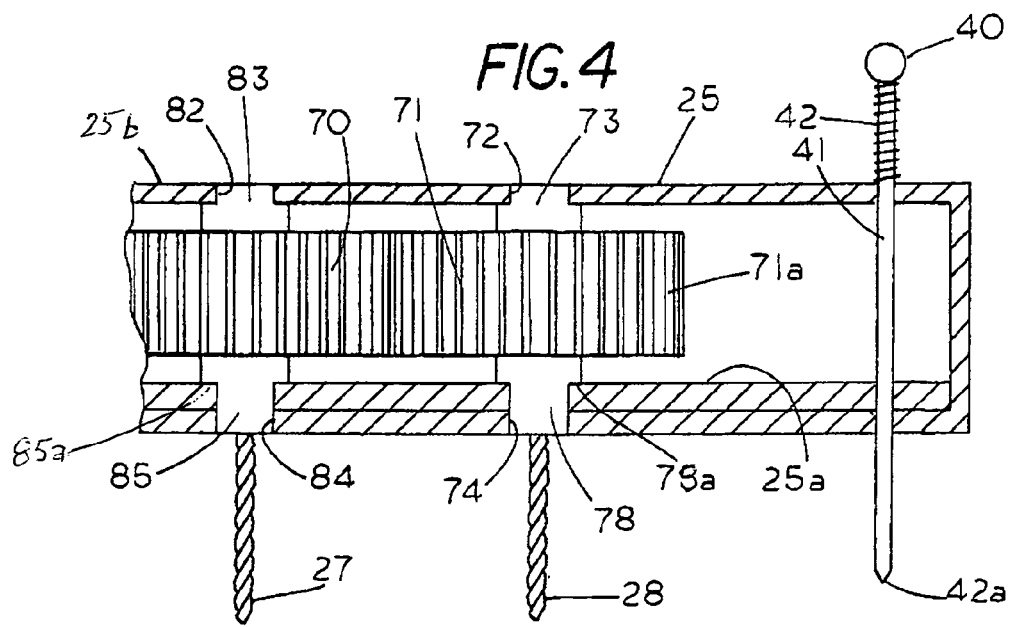
FIG. 4 is a cutaway front view of the shop tool attachment of FIG. 1.

FIG. 4 is a cutaway front view of a portion of the shop tool attachment 10 of FIG. 1 that reveals two spur gears 70 and 71 of the seven spur gears that are in intermeshing engagement with each other. A feature of the invention is that the central drive gear 17 and the driven spur gears contain plain bearings that are in rotational engagement with plain bearings formed in a upper thermoset plastic panel 25b and a lower thermoset plastic panel 25a. It has been found that the panels of a thermoset polymer plastic provide the stiffness or rigidity to rotationally support a set of polymer plastic gears. It has been further found that the use of a gears and axles, which are formed from a polymer plastic such as acetal resin, for example Delrin plastic, work well since the material provides both lubricity and rigidity to the axles. Thus, the combination of the rigidity of a thermoset polymer plastic support panels and a set of gears and axles which are made from a polymer plastic such as Delrin plastic provide an inexpensive yet durable and reliable shop tool attachment for home shop use or small business use. While the plastic gears can be formed inexpensively in comparison to metal gears the plastic gears have the further advantage of less inertia as well as a quieter and smother operation. In addition, the thermoset plastic gears are lightweight in comparison to metal gears making the shop tool attachment 10 a device that is easy to handle and manipulate. In the example shown each of the gears have the same diameter to provide for equal spacing between drilled holes. An example of a suitable lightweight material having sufficient lubricity for formation of the gears and the axles is Delrin, which is a polyoxymethylene plastic, available from Dupont. Although Delrin plastic is preferred other lightweight rigid materials of similar composition and lubricity may be used without departing from the spirit and scope of the invention.

In the example shown in FIG. 4 the drive gear 70 has a top shaft 83 rotationally supported by a plain bearing 82 in top panel 25b, which is formed from a thermoset plastic. An integral plain bearing 84 located in bottom panel 25a, which is also formed by a thermoset plastic, rotationally supports a bottom shaft 85. Similarly, a gear 71 has a top shaft 73 rotationally supported by an integral plain bearing 72 in top panel 25b. An integral plain bearing 74 located in bottom panel 25a rotationally supports a bottom shaft 78. A benefit of the use of both integral polymer plastic bearings and polymer plastic gears is that not only does it make the shop tool less expensive to manufacture but it also makes the operation of the shop tool quieter. The use of polymer plastic plain bearings and integral gear axle plain bearings also provides self-lubricating engagement therebetween. While only two of the seven gears are shown in FIG. 4 each of the axles of the other five gears are similarly supported by a plain bearing located in the top panel 25b and a plain bearing located in the bottom panel 25a of shop tool attachment 10. By the term plain bearing used herein denotes a bearing surface formed on either the outside cylindrical surface of a shaft or on an inside circumferential surface of a hole formed in either the top panel or the bottom panel of shop attachment tool 10. In order to provide rotational support and alignment of the drilled holes it is preferred that the diametrical differences between the plain axle bearings and the plain panel bearings be maintained at 0.005 inches or less. While the sets of the plain bearings on gears 70 and 71 and panels 25b and 25a have been described the plain bearings of the other gears and the support panels are identical thereto and will not be described herein.

In order to appreciate the rotational engagement and support provided by the polymer plastic gears and bearings reference should be made to FIG. 5, which shows a top view of three of the seven gears and a portion of drive gear 17. The top view shows gear 69 includes a circumferential set of teeth 69a that are in meshing engagement with the set of circumferential teeth 70a of an adjacent gear 70 and teeth 17a on drive gear 17. The teeth 70a of gear in turn are in meshing engagement with the teeth 71a of adjacent gear 71. In this example the drive gear 17 drives gear 69, which drives gear 70, which drives gear 71.

Figure 7:
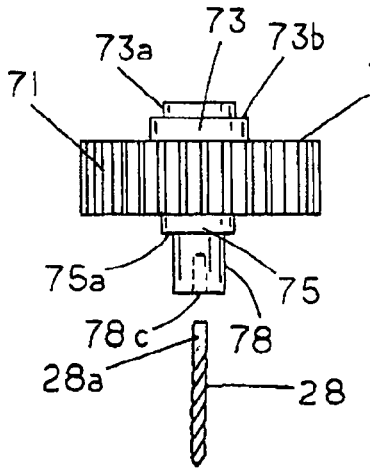
FIG. 7 is an exploded view showing a driven gear with an alternate drill bit securement for the shop tool attachment of FIG. 1.

A reference to FIG. 7 shows an isolated view of one embodiment of a gear 70 revealing the upper plain journaled thrust bearing 73a, an upper plain journaled thrust bearing 73b, a lower plain journaled thrust bearing 75a and the lower plain journaled thrust bearing 78. A feature of the invention is that the plain bearings i.e. cylindrical surfaces around the periphery of an opening, which are made from a rigid plastic such as a thermoset polymer plastic material, can be mated with polymer plastic shafts on the gears to provide an inexpensive rotational support for the gears while maintaining the gears in alignment and engagement with an adjacent gear.

Figure 6:
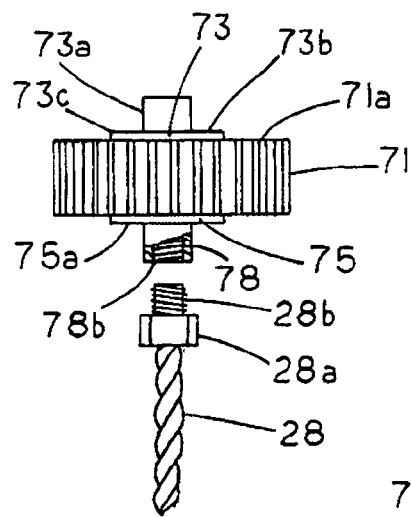
FIG. 6 is an exploded view of a drill bit and gear in the shop tool attachment of FIG. 1.

FIG. 6 shows an exploded and partial sectional view of gear 71 and a drill bit 28 of which reveals the interior of plain bearing 78, which includes a female thread 78b. Correspondingly, the top end drill bit adaptor 28a includes a mating male thread 28b to permit an operator to affix a drill bit 28 into the female thread 78b in plain bearing 78 through rotation of the drill bit 28 about a central axis. In this example the hex collar 28a on drill bit 28 enables wrench engagement thereto in order to tighten the male threads 28b into the female threads 78b to thereby maintain the drill bit 28 in a useable condition. It will be appreciated that it is preferable that the male threads and female threads on each of the adjacent gears and the adjacent drill bits have opposite threads to prevent the separation of the drill bit from the axle of the gear during the drilling operation. That is, on one gear the female threads and the male threads used to hold the drill bit will both be right handed and on an adjacent gear both the male thread and the male thread used to hold the drill bit will be left handed and mated with the rotation of the gear so that when torque is applied to the drill bit it tends to tightening rather than loosen the threaded engagement between the drill bit and the gear. Similarly, the drill bits are either left hand drill bits or right hand drill bits to correspond with the rotational direction of the gear. That is, the right hand and left hand drill bits are used so that the drill bits all drill bits rotate in the proper cutting direction even though the drill bits on adjacent gears rotate in an opposite directions.

FIG. 7 reveals an alternate embodiment and method for affixing a drill bit 28 having a cylindrical top surface 28a to an interior surface within the interior of a plain bearing on a gear. In this example one end of the drill bit 28 can be adhesively secured to the side of an opening 78c in bearing 78 or alternately the drill bit 28 may be frictionally held in bearing 78 through other means such as frictional engagement. As evidenced by FIG. 6 and FIG. 7 the interior of plain bearing 78 can provide for different types of drill bit engagement for rotationally supporting a drill bit therein. A feature of the invention is that the bearings, the drill bit support and the gear as shown in FIG. 6, FIG. 7 and FIG. 8 can be formed in an integral unit from a polymer plastic to provide a one-piece assembly that can be mounted directly between the rigid panels, which in an alternate example may be made from a metal such as aluminum.

Thus the invention includes a method of making an inexpensive or low cost shop tool attachment for a home workshop that can withstand the rigors of home workshop use or small business use. The method includes the steps of forming an upper elongated panel and a lower elongated panel from a thermosetting polymer plastic. One can then form a set of spaced apart plain bearings in the upper elongated panel and in the lower elongated panel by forming holes therein. One can form a set of gears from polymer plastic. One can then form an upper axle and a lower axle on each of the gears with a plain bearing on the upper axle and a plain bearing on the lower axle, which can be assembled as a unit. One can then mount the journaled thrust bearing on the upper axle of each of the gears in the plain bearing in the upper panel and mount the journaled thrust bearing on the lower axle of each of the gears in the plain bearing of the lower panel to rotationally support the gears therein. By attaching a drive shaft to at least one of the gears and securing the upper and lower panel in a spaced apart condition as shown in FIG. 4 each of the set of gears are rotationally supported therein to form an elongated support housing having a set of intermeshable gears. One can then attach drill bits to each of the gears through an adhesive or the like to form an inexpensive shop tool attachment. The top panel 25*b* and the bottom panel 25*c* can be attached to end panels to form an elongated workhead which can be conveniently attached to a conventional standalone shop power tool with the shop tool attachment receiving power from the standalone shop tool.

I claim:

1. A low cost shop tool attachment for a drill press comprising:

an elongated rigid plastic housing having an upper panel and a lower panel with the upper panel having a first set of integral plain bearings and the lower panel having a second set of integral plain bearings with the first set of integral plain bearings in axial alignment with the second set of integral plain bearings;

a polymer plastic drive gear rotationally supported between said upper panel and said lower panel;

a plurality of polymer plastic driven gears with each of said driven gears having an upper plain bearing engaging one of the integral plain bearings in the upper panel and a lower plain bearing engaging one of the integral plain bearing in the lower panel for axially and rotationally supporting each of said driven gears between said lower panel and said upper panel, each of said driven gears in driving engagement with an adjacent driven gear;

a hollow hub having a first end secured to said elongated housing and a free end for removable attachment to a stand alone shop tool whereby the hub fixedly supports the elongated housing;

a driveshaft axle in engagement with said drive gear with said driveshaft axle extending axially outward from said hub, whereby rotation of said driveshaft axle from an external power source rotates the drive gear;

a plurality of drill bits with one of the plurality of drill bits axially secured to said drive gear and the remaining of the plurality of drill bits secured to said plurality of driven gears so that rotation of the drive gear rotates the plurality of drill bits to thereby simultaneously form a set of aligned holes in a workpiece; and a two stage mechanical fuse for interrupting power to the drive gear if a drill bit encounters undue resistance with the two stage mechanical fuse comprising a shear pin (15*a*) extending through the driveshaft axle and an axle on the drive gear with the axle on the drive gear having a set of ears (17*a*, 18*b*) for engagement with the shear pin with either the shear pin or the ears yielding in response to undue resistance on a drill bit to limit damage to the shop tool attachment to replacement of the shear pin or the drive gear.

2. The shop tool attachment of claim 1 wherein the hub is metal; and a bracket (90) having one end mounts to the hub and the other end clampable to a drill press to support the elongated housing during a drilling operation with the driveshaft axle extending through the bracket for engagement with a chuck on the drill press.

3. The shop tool attachment of claim 2 wherein the hub includes a neck for bracket securement thereto and the bracket includes a compression collar (90*a*) that can be compressed by tightening a bolt (90*b*) to frictionally grasp and securely hold the hub and the elongated housing during a drilling operation.

4. The shop tool attachment of claim 3 wherein each of the plurality of drill bits are removably mounted.

5. The shop tool attachment of claim 4 including a set of male threads on each of the plurality of drill bits and a set of female threads on the drive gear and a set of female threads on each of the plurality of driven gears.

6. The shop tool attachment of claim 5 wherein the drill bit secured to the drive gear and the remaining drill bits secured to the plurality of driven gears comprise left hand drill bits and right hand drill bits alternately located therealong.

7. The shop tool attachment of claim 1 wherein the rigid material comprises a thermosetting plastic or a metal and the drive gear and the plurality of driven gears are formed from a polymer plastic such as Delrin plastic.

8. The shop tool attachment of claim 1 wherein the drive gear and the plurality of driven gears comprises at least seven gears rotationally supported in the housing.

* * * * *